United States Patent
Blanc et al.

(10) Patent No.: US 6,467,922 B1
(45) Date of Patent: Oct. 22, 2002

(54) METHOD AND APPARATUS FOR LASER MACHINING LIGHT GUIDES, LIGHT GUIDES OBTAINED THEREBY, AND BACK-LIT SCREENS INCORPORATING SUCH LIGHT GUIDES

(75) Inventors: Christophe Blanc, Pertuis; Frédéric Chazallet, Marseilles, both of (FR)

(73) Assignee: GC Communication, Marseilles (FR)

(*) Notice: Subject to any disclaimer, the term of this patent is extended or adjusted under 35 U.S.C. 154(b) by 22 days.

(21) Appl. No.: 09/613,477

(22) Filed: Jul. 11, 2000

(30) Foreign Application Priority Data

Dec. 9, 1999 (FR) .............................. 99 15590

(51) Int. Cl.$^7$ .............................................. F21V 7/04
(52) U.S. Cl. ..................... 362/31; 362/561; 362/338; 362/555; 362/800
(58) Field of Search ..................... 362/31, 553, 561, 362/337, 338, 339, 348, 355, 800

(56) References Cited

U.S. PATENT DOCUMENTS

| | | | |
|---|---|---|---|
| 4,989,933 A | 2/1991 | Duguay | 359/599 |
| 5,461,547 A | 10/1995 | Ciupke et al. | 349/64 |
| 5,477,422 A | 12/1995 | Hooker et al. | 349/62 |
| 5,584,556 A | 12/1996 | Yokoyama et al. | 349/62 |
| 5,587,816 A | 12/1996 | Gunjima et al. | 349/62 |
| 5,662,410 A | * 9/1997 | Suganuma | 362/268 |
| 5,779,337 A | * 7/1998 | Saito et al. | 362/31 |
| 5,926,601 A | 7/1999 | Tai et al. | 349/64 |

FOREIGN PATENT DOCUMENTS

| | | | |
|---|---|---|---|
| EP | 0495273 | 7/1992 | |
| EP | 0800036 | 10/1997 | |
| EP | 0945674 | * 3/1999 | 362/31 |
| EP | 0945674 | 9/1999 | |
| WO | 9205535 | 4/1992 | |
| WO | 9636892 | 11/1996 | |

* cited by examiner

Primary Examiner—Sandra O'Shea
Assistant Examiner—Bertrand Zeade
(74) Attorney, Agent, or Firm—Ladas & Parry

(57) ABSTRACT

A method of manufacturing a light guide in the form of a plate having a face with a plurality of diffusing patterns obtained by means of a laser beam, wherein said face is exposed to radiation of intensity lying in the range $10^4$ W/cm$^2$ to $10^7$ W/cm$^2$, in particular in the range $3\times10^4$ W/cm$^2$ to $3\times10^6$ W/cm$^2$, so as to form surface irregularities and irregularities in depth.

19 Claims, 3 Drawing Sheets

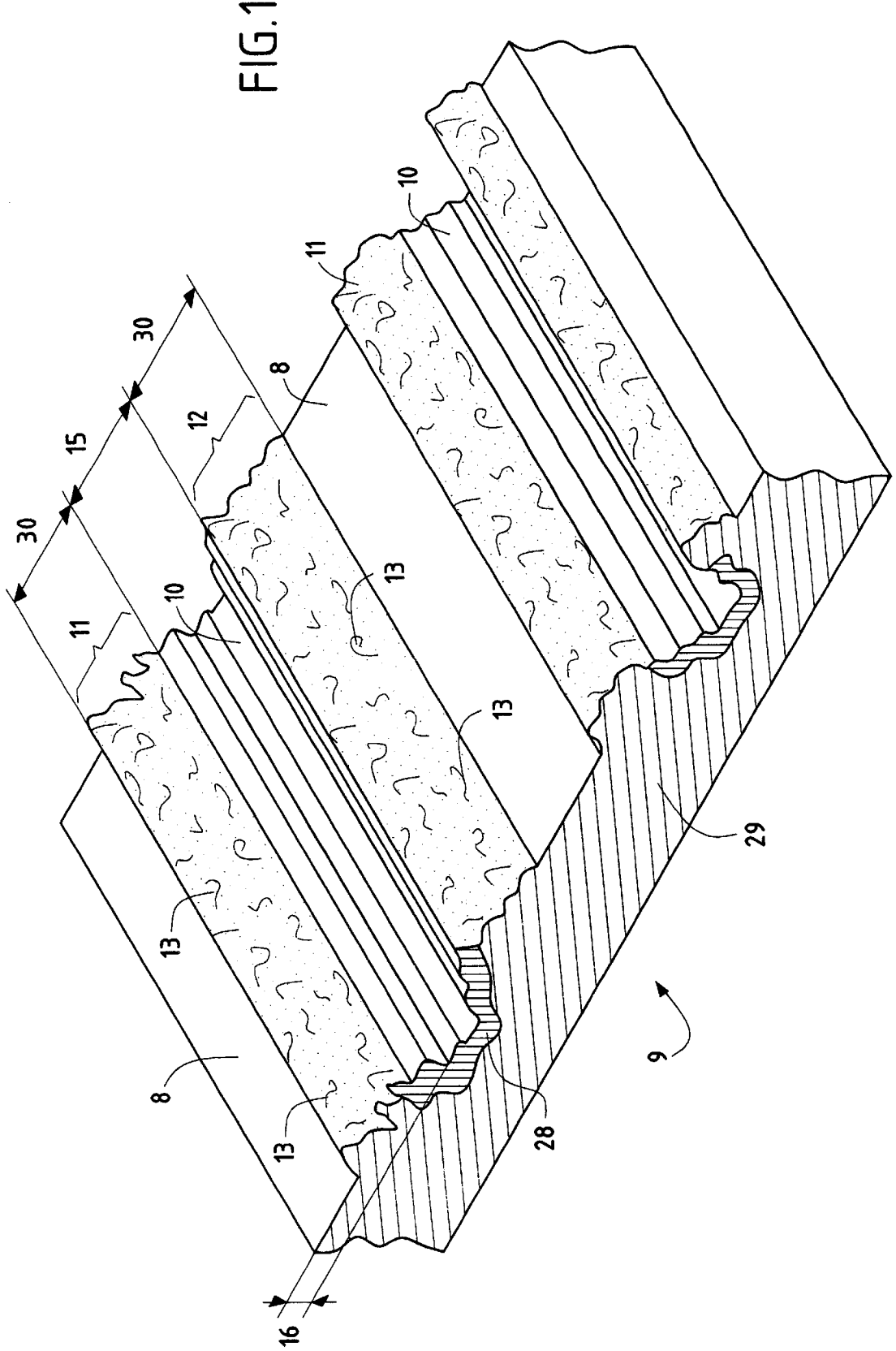

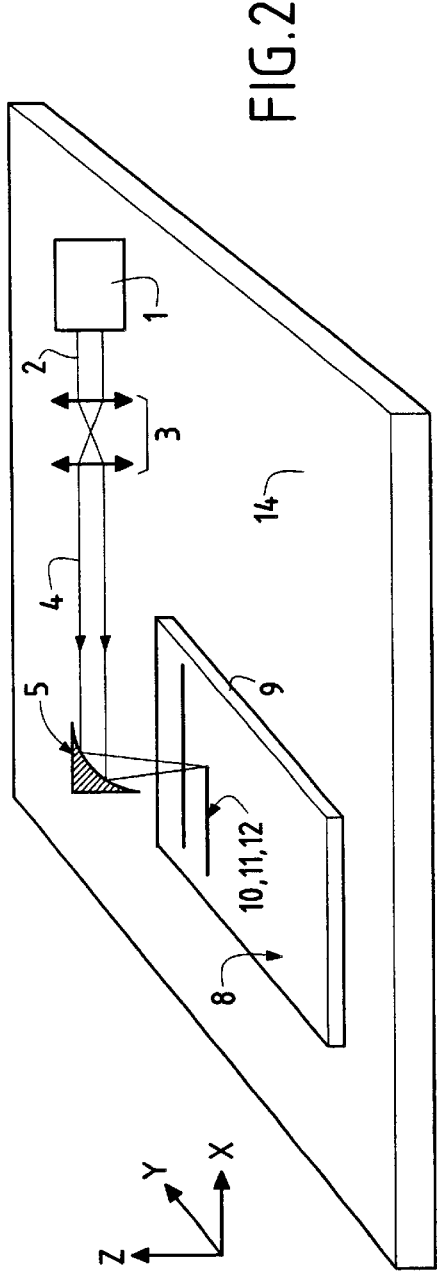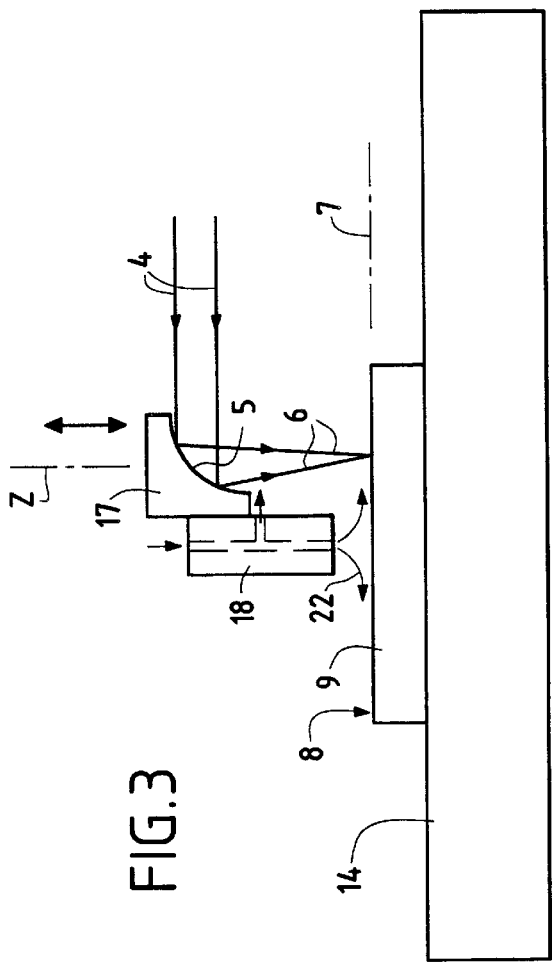

METHOD AND APPARATUS FOR LASER MACHINING LIGHT GUIDES, LIGHT GUIDES OBTAINED THEREBY, AND BACK-LIT SCREENS INCORPORATING SUCH LIGHT GUIDES

The present invention relates to a method and to apparatus for using a laser to machine light guides, to light guides obtained thereby, and to back-lit screens incorporating such light guides.

The invention applies more particularly to light guides in the form of a generally plane than plate constituted by a material that is translucent or transparent, in particular glass, polycarbonate, or polymethyl methacrylate.

BACKGROUND OF THE INVENTION

Such light guides are used in particular for making luminous display devices such as signs, and in making display terminals for computers and similar electronic apparatuses, in particular for back lighting liquid crystal screens. In those applications in particular, the light produced by a source is injected into the light guide via one or more of its side faces (edges), with the light leaving the light guide via one (or both) of its two main faces that are generally parallel to each other.

In those applications in particular, it is desirable for the light flux density leaving the main face to be as uniform as possible. It is also desirable to avoid or at least limit losses or leakage of light. In order to back-light a liquid crystal (LCD) display, it is essential for such performance to be optimized and for mass, size, and cost to be minimized.

To manufacture such light guides, it is known for the main face of the light guide that is to radiate light and that is to be placed against the rear face of the LCD display to have formed therein, generally by molding, projections and/or depressions of regular shape, e.g. of prismatic shape, and which are regularly distributed over all or part of the surface of said main face. Another technique consists in forming "spot" masks on said face constituted by a covering applied to said face and pierced by orifices to allow light to pass through.

It is also known from document EF-A-0 945 674 to machine linear diffusing patterns at regularly variable spacing by means of a laser beam.

OBJECTS AND SUMMARY OF THE INVENTION

An object of the present invention is to provide an improved method of manufacturing such visible light guides.

Another object is to propose apparatus for implementing the method.

Another object is to propose improved light guides and display devices incorporating such light guides.

To this end, in a first aspect, a main face of the light guide that is to diffuse (visible) light is exposed to laser radiation that is sufficiently/intensive and/or sufficiently prolonged to form a deep (central) depression in the surface of said main face together with a plurality (several tens or hundreds) of irregular "peripheral" projections and/or depressions disposed on either side of said central depression (and/or surrounding it), of amplitude (in area and in relief) that is generally irregular and less than the amplitude of said central depression.

In another aspect, a main face of a light guide is exposed to laser radiation that is sufficient to form a plurality of surface projections (and respective depressions) that differ from one another in shape and height (or depth), and to cause non-uniform zones to be formed within the light guide and substantially in register with said projections and depressions, which zones differ from one another in size, shape, and refractive index.

To this end, said main face is preferably subjected to radiation of intensity lying in the range $10^4$ watts per square centimeter ($W/cm^2$) to $10^7$ $W/cm^2$, and in particular in the range $3\times10^4$ $W/cm^2$ to $3\times10^6$ $W/cm^2$. To obtain a concentrated laser beam from the beam emitted by a commercially available source, a concentrator is interposed on the path of the beam, said concentrator preferably being a parabolic mirror. Means are also provided for maintaining the mirror at a predetermined distance from said main face.

The presence of such deformations and irregularities both at the surface of the main face of the light guide plate and within it, gives rise to improved and regularly distributed diffusion of the light that leaves via said main face of the light guide. It seems likely that the presence of the irregular projections and depressions contributes significantly to the observed good performance as measured on samples processed in accordance with the invention.

To this end, it is important to obtain a beam at the outlet from the concentrator that includes a focal zone (or spot) of small dimensions. The diameter of the spot at the focus preferably lies in the range 10 microns ($\mu$m) to 200 $\mu$m, and in particular in the range 25 $\mu$m to 100 $\mu$m.

It is also important to maintain the focal plane containing said spot in the immediate vicinity of the surface to be machined, in particular at a distance therefrom that is of the order of $\pm 10$ $\mu$m to $\pm 100$ $\mu$m.

To this end, and in particular when machining transparent plate materials of thickness that varies from one plate to another and/or varies from one area to another in a given plate, it is necessary to provide dynamic concentrator-positioning means for positioning the concentrator relative to said surface so that the distance between the surface of the plate and the focal plane remains within said limits. To this end, in a preferred embodiment, the mirror is mechanically linked to a part that forms a pneumatic bearing member that bears against said surface so as to obtain a constant distance between the bearing member and the surface (which distance generally lies in the range about 10 $\mu$m to about 100 $\mu$m).

In a preferred embodiment where the central depression extends along a continuous rectilinear line, it forms a gutter having projecting zones (or side strips) extending along each of its sides, which zones include depressions that are irregularly shaped and located. This gutter (or groove) is preferably 5 $\mu$m to 50 $\mu$m deep, 5 $\mu$m to 200 $\mu$m wide, and in particular about 50 $\mu$m to 100 $\mu$m wide, and each of said zones extends over a width that is substantially equal to the width of the central gutter. The mean width of a diffusing pattern (including said groove and the two side strips) is preferably greater than 100 $\mu$m and less than 400 $\mu$m, and in particular lies in the range 100 $\mu$m to 250 $\mu$m.

The machining apparatus preferably comprises:
- a bench suitable for supporting a plate of transparent material to be machined;
- a laser source suitable for emitting a laser beam and mounted in fixed relationship to the bench;
- one or more mirrors for reflecting said beam and directing it substantially parallel to the bench; and
- said beam concentrator which is mounted to move relative to the bench along at least two orthogonal directions (two axes X and Y), so as to be able to move in particular along a grid of parallel straight line segments so as to form parallel diffusing grooves;

said concentrator (or parabolic mirror) being also mounted to move (relative to the bench) along a third direction (their axis Z) that is generally orthogonal to the first two directions, thereby enabling its outlet focal plane to be brought into coincidence with the surface to be machined.

A beam expander, e.g. constituted by a pair of coaxial lenses having different focal lengths, is preferably disposed between the source and the concentrator, and is preferably mounted in a fixed position relative to the bench. The expander serves to reduce the size of the focal spot delivered by the concentrator by increasing the aperture of the beam.

A diffusing and refracting pattern is machined on the surface of and within the plate by moving the outlet focal spot from the concentrator over the surface of the plate. In particular, this machining is obtained by moving a parabolic mirror which is maintained by means of a cushion of air (or some other gas) at a constant distance from the surface to be machined, which distance corresponds to the focal length. The speed of this displacement is preferably selected to lie in the range 0.2 meters per second (m/s) to 4 m/s, so as to match the energy density of the beam to the "hardness" of the material that is to be machined, and also to the mean depth and width desired for the depressions that are formed.

The use of a parabolic mirror also makes it possible to improve focusing of the beam as reflected by the mirror so as to form a small focal spot in the focal plane.

In the preferred case where light injection takes place via a single longitudinal edge of a rectangular light guide plate, said plate is fitted with a mirror extending against (and facing) the longitudinal edge thereof which is opposite to the edge through which light is injected into the light guide. For back lighting an LCD display, it is preferable to use a row of LEDs as the light source, in particular of LEDs that emit "white" light or else a series of triplets of LEDs emitting light in three colors enabling additive combination to be performed (red, green, blue, red, green, blue, . . . ). In order to reduce the size of the display device, it is possible to use LEDs integrated in an elongate CMS circuit of a shape that corresponds to the shape of the edge, and it is possible to use a light guide plate of thickness lying in the range about 1 millimeter (mm) to 2 mm.

Alternatively, the light source can be constituted by a tube such as a cold cathode fluorescent tube (CCFT).

The main (emitting) face of the light guide can have a plurality of diffusing patterns in the form of points (or spots). Nevertheless, these patterns preferably extend in the form of straight line segments parallel to the edge through which light is injected, these segments being of substantially constant profile (width and height), and being spaced apart substantially regularly in non-monotonic manner: the distance between two adjacent segments decreases on going away from the light injection edge towards an intermediate zone of the light guide between said injection edge and the reflection edge extending along the opposite side of the light guide, after which said distance increases on going away from said intermediate zone towards said reflection edge. This decrease and increase preferably takes place substantially in the form of a geometric progression (e.g. to within 10%).

In a variant, the linear diffusing patterns can be spaced apart substantially regularly. Under such circumstances, it is the width and/or the depth of said central depression (or groove) that is caused to vary in non-monotonic manner from said injection edge towards said reflection edge, and to vary in inverse manner to that described above concerning the distance between grooves that are identical. It is possible from one diffusing pattern to another to vary the amount of energy that is radiated, for example by varying the power delivered by the laser source and/or by varying the spacing between the outlet focal plane from the concentrator and the surface to be machined.

These non-monotonic variations are also applicable when two sources are provided that inject light via two opposite edges of the light guide plate. When only one (linear) light source is used and when the opposite edge is not fitted with a mirror, it is possible to use spacing that varies monotonically, as described in document EP 0 945 674.

The excellent efficiency and very good light diffusion as delivered by the light guide can, in certain applications, make it possible to omit the diffusing screen that is usually provided for back lighting an LCD display and which is generally disposed between the light guide and the display or else in front of the display.

It has also been observed that light guides of the invention are particularly suitable for obtaining highly uniform diffusion of the light that comes from a plurality of sources (LEDs) in spite of the discontinuous (non-uniform) nature of the light flux injected through the edge in such a configuration.

BRIEF DESCRIPTION OF THE DRAWINGS

Other advantages and characteristics of the invention will be understood on reading the following description which refers to the accompanying drawings which show preferred embodiments of the invention, without the invention being limited thereto.

FIG. 1 is a diagrammatic perspective view of two linear diffusing patterns formed or a light guide and presenting irregular surface deformations and non-uniformities in depth.

FIG. 2 is a diagram showing the main components of apparatus of the invention.

FIG. 3 is a diaorammatic side view showing an implementation detail of a support for the laser beam concentrator;

MORE DETAILED DESCRIPTION

Figure 4:
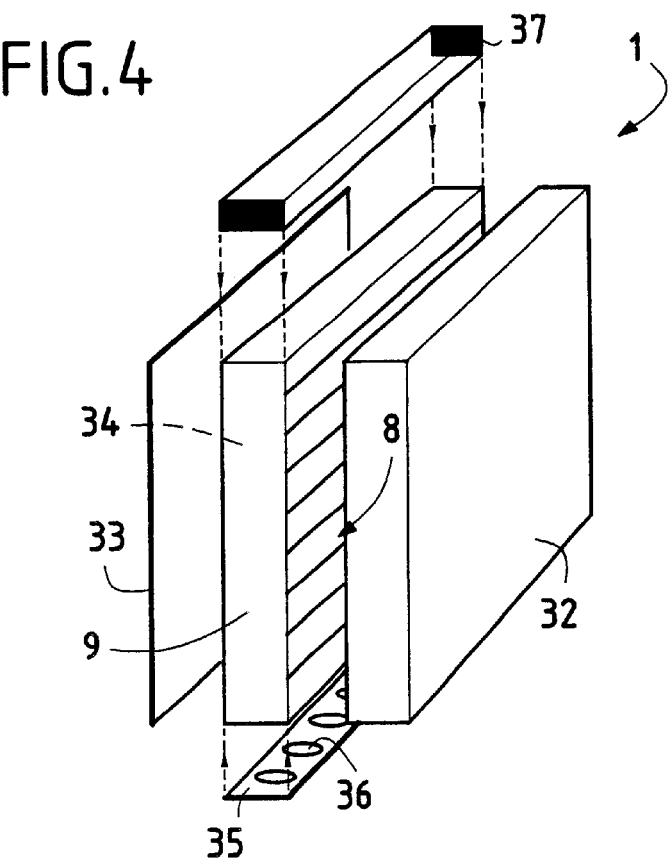
FIG. 4 is a diagrammatic perspective view of an LCD display fitted with a light guide of the invention.

The $CO_2$ laser source 1 (FIG. 2) delivering power that is preferably situated in the range 10 watts (W) to 100 W, and in particular about 50 W, outputs a laser beam 2 having a diameter of a few millimeters (mm); this beam passes through an expander 3 so that the diameter of the laser beam 4 leaving the expander is multiplied by a factor of about 2 to 3.

The beam 4 is reflected by a parabolic mirror 5 which delivers a beam 6 that converges in its focal plane (FIG. 3). When the plane 7 coincides substantially with a plane that is tangential to the top face 8 of a plate 9 to be machined, the intensity of the radiation at the focus of the mirror 5 causes the temperature of the material constituting the plate to rise very greatly in the vicinity of said focus. This gives rise to very fast and irregular deformation of the plate in the vicinity of the focus, both on its surface and in depth. By moving the mirror 5 parallel to the plate 9, a groove 10 of irregular profile is formed, which groove lies between two side zones 11 and 12 in the form of strips or ridges in which it can be seen that craters and sharp edges 13 are formed in an irregular configuration.

The rectangular plate of transparent material 9 is placed flat on a bench 14 to which the source 1 is secured. The mirror 5 is mounted to move relative to the bench 14 along two axes X and Y (FIG. 2) that are parallel to the plane of the support bench 14. The mirror 5 is moved along these two axes by means of two linear drive means (not shown, such as actuators or conveyors) extending along two orthogonal axes parallel to the plane of the bench 14. This movement is controlled by a computer (not shown) fitted with a program for calculating the position, the mean spacing and/or width 15 and depth 16 (FIG. 1) of the diffusing patterns to be formed on the face 8 of the plate 9, and/or the duration of exposure, and/or the travel speed of the mirror along said axes, and/or the intensity of the beam 2, thereby enabling patterns to be obtained of shape and of diffusing characteristics that are predetermined.

Figure 5:
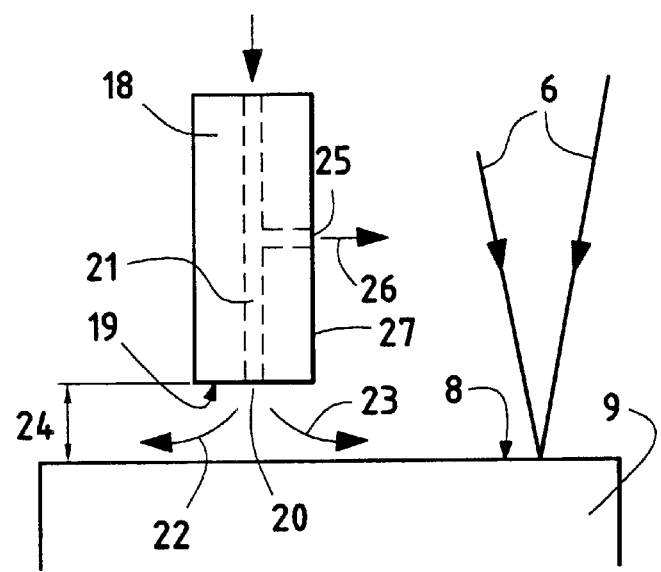
FIG. 5 is on a larger scale and shows means enabling a cushion of air to be produced between the bearing member of the concentrator mirror support and the top face of the plate to be machined, and also means for producing a curtain of air for protecting said mirror from any spitting that can result from the machining.

Furthermore, the mirror 5 (and/or its support 17) 1s mounted so as to be movable relative to the bench 14 along an axis Z that is perpendicular to the XY plane of the table (FIG. 3). A bearing member 18 secured to the support 17 and/or the mirror 15 is provided at its base with a plane facet 19 for "pressing" via a cushion of air against the top face 8 of the plate in the vicinity of the zone machined by the beam 6. For this purpose, the face 19 is pierced by an orifice 20 through which compressed air is ejected, said air being delivered by a source (not shown) and conveyed to the orifice 20 by means of a duct 21 provided in the bearing member 18. The air ejected through the orifice 19 strikes the face 8 and flows in the directions shown by arrows 22 (FIG. 5 being a detail of FIG. 3, but on a larger scale). By maintaining the flow rate (and/or the pressure) of the ejected air at a determined value, it is possible to maintain the base 19 of the bearing member 18 at a constant height 24 above the face 8, said height being of the order of a few tens of microns ($\mu$m). Conseauently, the focal plane 7 is maintained at a constant distance (substantially zero) from the face 8. This device makes it possible to control and/or maintain determined intensity and impact size for the beam 6 on the face 8 of the plate.

The compressed air ejected along arrow 23 towards the beam 6 also serves to prevent and/or limit dirtying of the mirror 5 due to any spitting that can result from the thermal damage imparted by the beam 6 to the plate 9, by encouraging any particles that come off from the plate to be entrained in a curtain of air for protecting the mirror. This effect can be increased by providing a second compressed air outlet orifice 25 in a side face 27 of the bearing member 18 so as to cause another jet 26 to be formed directed towards the beam 6, thereby causing the particles given off by the beam attacking the plate to be moved away from the mirror.

With reference to FIG. 1, the face 8 of the plate 9 of transparent plastics material has two parallel linear diffusing patterns. Each pattern comprises a groove 10 of width 15 close to 20 $\mu$m and a depth 16 close to 15 $\mu$m. Each groove lies between a left side strip 11 and a right side strip 12, with each strip having a width 30 that is close to 70 $\mu$m and including roughnesses 13 that are formed and disposed in irregular manner. Beneath each pattern 10, 11, 12 there extends a strip of material 28 of optical property (index) that is perceptibly different from that of the portion 29 of material that lies between two patterns.

With reference to FIG. 4, the display device 31 comprises a liquid crystal display 32 with the diffusing face 8 of the light guide 9 placed against the rear face thereof. A thin white diffusing screen 33 is placed against the rear face 34 of the light guide 9 opposite from the face 8. Along the bottom edge of the plate 9 there extends a circuit 35 fitted with a plurality of LEDs 36 that are substantially regularly placed apart. Along the top edge of the plate 9 there extends a mirror 37 which reinjects into the light guide that portion of the incident light whIch is not diffused by the face 8 (e.g. about 20%). The brightness of the face 8 of the guide 9 can reach, and possibly even exceed, 500 candelas per square meter (cd/m$^2$).

In a variant that is not shown, the display device 31 can have two light guides 9 placed thereagainst: the front face 8 of a "rear" light guide being against the rear face 34 of a "front" light guide, with each of the light guides being associated with a respective source. This makes it possible to obtain approximately double the brightness for the front face 8 of the front light guide, i.e. about 1000 cd/m$^2$.

What is claimed is:

1. A light guide in the form of a plate having a face that includes a plurality of diffusing patterns, in which each of said patterns comprises a depression and peripheral projections disposed on either side of said depression, said depression having a depth with respect to said face.

2. A light guide according to claim 1, in which said depression is in the form of a groove, in which said peripheral projections form two side strips extending along the edges of the groove.

3. A light guide according to claim 2, in which the depth of the groove lies in the range 5 $\mu$m to 50 $\mu$m.

4. A light guide according to claim 1, in which the mean width of said diffusing patterns is greater than 100 $\mu$m and less than 400 $\mu$m.

5. A light guide according to claim 3, which is constituted by a material that transmits visible light and selected from glass, polycarbonate, and polymethyl methacrylate.

6. A light guide according to claim 1, in which the width of said depression lies in the range 5 $\mu$m to 200 $\mu$m.

7. A display device comprising a liquid crystal display and a light guide in the form of a plate having a face having a plurality of diffusing patterns, in which each of said patterns comprises a central depression of irregular shape and peripheral projections disposed on either side of said central depression, said depression having a depth with respect to said face.

8. A device according to claim 7, in which said depression is in the form of a groove, in which peripheral projections form two side strips extending along the edges of the groove, the light guide being against the rear face of said liquid crystal display, and said device further comprises a mirror extending along a first edge of the light guide and a plurality of LEDs mounted on a circuit extending along a second edge of the light guide, opposite to its first edge.

9. A method of manufacturing a light guide in the form of a plate having a plurality of diffusing patterns obtained by means of a laser beam, in which said face is exposed to radiation of intensity lying in the range 10$^4$ W/cm$^2$ to 10$^7$ W/cm$^2$, so as to form surface irregularities and irregularities in depth, and such that each of said patterns includes a central depression and peripheral projections disposed on either side of said central depression.

10. A method according to claim 9, in which said face is exposed to radiation of intensity lying in the range 3×10$^4$ W/cm$^2$ to 3×10$^6$ W/cm$^2$.

11. A method according to claim 9, in which the laser beam is concentrated in a focal plane which is maintained substantially in coincidence with the face by causing a support for a beam concentrator to bear against the face via a cushion of air.

12. A method according to claim 9, in which the diameter of the laser beam emitted by a source is enlarged prior to being concentrated, and in which the beam is concentrated to form a focal spot of diameter lying an the range 10 $\mu$m to 200 $\mu$m.

13. A method according to claim 12, in which the concentrated beam is displaced along two axes at a speed selected to lie in the range 0.2 m/s to 4 m/s.

14. Apparatus for manufacturing a light guide in the form of a plate having a face with a plurality of diffusing patterns obtained by means of a laser beam, which apparatus comprises a laser beam concentrator and means enabling the outlet focal plane of the concentrator to be caused to coincide substantially with said face so as to obtain a concentrated beam enabling a pattern to be formed comprising a depression and a plurality of peripheral projections disposed on either side of said depression, the radiation intensity of the concentrated beam lying in the range $10^4$ W/cm$^2$ to $10^7$ W/cm$^2$.

15. Apparatus according to claim 14, comprising:
- a bench suitable for supporting a plate of transparent material to be machined;
- a laser source suitable for emitting a laser beam and mounted in a fixed position relative to the bench;
- one or more mirrors for reflecting said beam and directing it substantially parallel to the bench; and
- a beam concentrator mounted to move relative to the bench along at least two orthogonal first directions so as to be capable of being displaced in particular along a grid of parallel straight segments to form parallel diffusing grooves;
- said concentrator also being mounted to move relative to the bench along a third direction that is generally orthogonal to the two first directions, in such a manner as to enable its outlet focal plane to be brought into coincidence with the surface to be machined.

16. Apparatus according to claim 15, further comprising a beam enlarger disposed between the laser source and the beam concentrator.

17. Apparatus according to claim 14, in which the concentrator comprises a parabolic mirror.

18. Apparatus according to claim 14, further including means for producing a jet or a curtain of gas to protect the concentrator and prevent or limit dirtying thereof.

19. A light guide obtained by a method according to claim 9.

* * * * *